(12) United States Patent
 Ashikhmin

(10) Patent No.: US 8,270,515 B2
(45) Date of Patent: Sep. 18, 2012

(54) PROVIDING FEEDBACK IN A MIMO SYSTEM

(75) Inventor: Alexei Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1140 days.

(21) Appl. No.: 11/899,494

(22) Filed: Sep. 6, 2007

(65) Prior Publication Data

US 2009/0067530 A1 Mar. 12, 2009

(51) Int. Cl.
 *H04B 7/02* (2006.01)
(52) U.S. Cl. ........ 375/267; 375/260; 375/262; 375/265; 375/295; 375/316
(58) Field of Classification Search .................. 375/267, 375/260, 262, 265, 295, 316; 370/203, 204, 370/208, 209, 210
 See application file for complete search history.

(56) References Cited

U.S. PATENT DOCUMENTS

| 6,990,626 | B2 | 1/2006 | Ashikhmin | |
|---|---|---|---|---|
| 7,013,116 | B2 | 3/2006 | Ashikhmin et al. | |
| 7,278,082 | B2* | 10/2007 | Kim et al. ..................... | 714/752 |
| 7,545,867 | B1* | 6/2009 | Lou et al. ..................... | 375/259 |
| 7,684,761 | B2* | 3/2010 | Hottinen ........................ | 455/69 |
| 7,702,029 | B2* | 4/2010 | Kotecha et al. ............... | 375/267 |
| 2003/0188250 | A1 | 10/2003 | Ashikhmin | |
| 2004/0002309 | A1 | 1/2004 | Ashikhmin et al. | |
| 2005/0182994 | A1 | 8/2005 | Ashikhmin et al. | |
| 2005/0210367 | A1 | 9/2005 | Ashikhmin et al. | |
| 2005/0243895 | A1 | 11/2005 | Ashikhmin et al. | |
| 2006/0068714 | A1 | 3/2006 | Sharma et al. | |
| 2007/0053460 | A1 | 3/2007 | Ashikhmin | |
| 2007/0071147 | A1* | 3/2007 | Sampath et al. ............... | 375/347 |
| 2007/0155433 | A1* | 7/2007 | Ito et al. ..................... | 455/562.1 |
| 2009/0023467 | A1* | 1/2009 | Huang et al. .................. | 455/522 |

FOREIGN PATENT DOCUMENTS

WO WO2007/094832 8/2007

OTHER PUBLICATIONS

Jindal, Nihar. "A Feedback Reduction Technique for MIMO Broadcast Channels;" Information Theory, 2006 IEEE International Symposium on http://ieeexplore.ieee.org/xpl/RecentCon.jsp?punumber=4035458; Jul. 2006 pp. 2699-2703.
European Patent Office—Notification of Transmittal of the International Search Report and the Written Opinion of the International Searching Authority, or the Declaration; Dec. 15, 2008.

* cited by examiner

*Primary Examiner* — Dhaval Patel
(74) *Attorney, Agent, or Firm* — Fletcher Yoder PC

(57) ABSTRACT

There is provided a system and method of operating a multiple-input multiple-output (MIMO) receiver with N antennas in a wireless communication system. The method includes measuring N vectors, each vector defining channel transfer coefficients between M antennas of a transmitter and a corresponding antenna of the receiver. Additionally, a vector in a linear space generated by the N measured vectors is selected and quantized values of less than M components of the selected vector are fed back to the transmitter.

10 Claims, 3 Drawing Sheets

PROVIDING FEEDBACK IN A MIMO SYSTEM

BACKGROUND OF THE INVENTION

1. Field of the Invention

The present invention is related to communication systems. More particularly, the present invention is related to wireless communication systems having multiple transmitter and receiver antennas.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

Over the past several decades, the wireless communications industry has grown at an incredible rate. The convenience and usefulness of wireless communications cannot be understated. Indeed, the devices which use the wireless communication systems, including cell phones, personal digital assistants, and notebook computers, have become nearly ubiquitous. People are using the devices at all times of the day, for business and leisure.

In an effort to increase the usefulness and convenience of the devices, the wireless communications industry is a continuously seeking to increase the capacity of wireless systems. One way of increasing the capacity of a wireless communication system is configuring the system to have multiple antennas at both the transmitters and receivers. Such systems are commonly referred to as multiple-input multiple output (MIMO) systems. The MIMO systems are capable of achieving increased capacity compared to systems implementing only single antennas at either the receiver or transmitter by using preceding techniques. The preceding techniques reduce or eliminate interference between different receiver antennas using measurements of a channel transfer matrices of pilot beams transmitted by the transmitter. The measurements are fed back to the base station and, generally, the information about channel vectors provided by the measurements allows a dramatic increase in the throughput of the entire system.

It has been suggested each mobile device use a quantization code book C consisting of $2^B$ complex M-tuples of norm one, where B represent the number of bits sent as feedback to the base station and M represents the number of base station transceivers. Stated mathematically:

$$C=\{c_1, \ldots, c_{2^B}\}, c_i \in C^M, \|c_i\|=1 \quad (1).$$

Each mobile device, therefore, performs the following steps:

1) Defines a vector space Q spanned by its channel vectors $h_1, \ldots, h_N \in C^M$, where N is the number of transceivers at the mobile, i.e.:

$$Q=\text{span}(h_1, \ldots, h_N)=\{a_1 h_1 + \ldots + a_N h_N : a_1, \ldots, a_N \in C\}, \quad (2);$$

2) Finds a code vector $c_r \in C$ that has the minimum angle between the code vector and Q, i.e. it finds:

$$r=\arg\min_{c_j \in C}\{|\angle(c_j, Q)|\}, \quad (3); \text{ and}$$

3) Transmits the index r to the base station.

After receiving the feedback information, indexes r from all mobile devices in the wireless communication devices, the base station uses a precoding technique for broadcasting information to the mobile devices. For example, a zero-forcing preceding technique may be used, such as that disclosed in "On the Achievable Throughput of a Multiantenna Gaussian Broadcast Channel," by G. Caire and S. Shamai, published in *IEEE TRANS. INFORM. THEORY*, vol. 49, pp. 1691-1706, July 2003; and "A Feedback Reduction Technique for MIMO Broadcast Channels" Jindal, N.; *INFORMATION THEORY*, 2006 *IEEE INTERNATIONAL SYMPOSIUM*, pp. 2699-2703, July 2006, available at http://ieeexplore.ieee.org/xpl/RecentConjsp?punumber=4035458. Both of the above mentioned articles are incorporated herein by reference.

Unfortunately, the brute force implementation of step 2 of the above algorithm has a high level of complexity and is computationally burdensome. For example, if 20 bits are transmitted back to the base station, i.e., B=20, C becomes $2^{20}$ M-tuples of norm one which is prohibitively too many, and step 2 becomes too complex. The reason for the high complexity of step 2 is that the subspace Q is multidimensional. The channel vectors $h_1, \ldots, h_N$ are random vectors and, therefore, the dimension of Q is a random number. Typically, the dimension of Q will be equal to N, which represents the number of receivers of a mobile device. There are no fast algorithms for searching among the code vectors of the codebook C to find the code vector with the smallest angle between the vector and the multidimensional space Q. As such, using contemporary techniques, the measurements may require extensive hardware and/or software in the receiver and/or extensive processing time in the receiver. However, only a limited amount of time and resources are available for any feedback transmission from a receiver. Specifically, a mobile device only has time to send few bits back to the base station.

BRIEF SUMMARY OF THE INVENTION

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

In accordance with an exemplary embodiment of the present invention, there is provided a method of operating a receiver with N antennas in a MIMO system. The method includes measuring N vectors, each vector defining channel transfer coefficients between M antennas of a transmitter and a corresponding antenna of the receiver. A vector in a linear space generated by the N measured vectors is selected and quantized values of less than M components of the selected vector are fed back to the transmitter.

In accordance with an alternative embodiment, there is provided a communication system. The communication system includes a receiver with N antennas and a multiple-input multiple-output (MIMO) transmitter with M antennas. The transmitter is configured to communicate data from the M antennas to the N antennas of the receiver. The receiver is configured to measure N vectors in response to the transmitter transmitting pilot signals, each vector defining channel transfer coefficients between the M antennas of the transmitter and a corresponding antenna of the receiver. Additionally, the receiver is configured to select a vector in a linear space generated by the measured vectors and to feed back quantized values of less than M components of the selected vector to the transmitter.

BRIEF DESCRIPTION OF THE SEVERAL VIEWS OF THE DRAWINGS

Advantages of the invention may become apparent upon reading the following detailed description and upon reference to the drawings in which.

DETAILED DESCRIPTION OF THE INVENTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with present techniques, there is provided a system and method for efficiently providing channel vector measurements as feedback to a transmitter in a multiple-input multiple-output (MIMO) wireless communication system. Specifically, there is provided a method for operating a receiver with N receiving antennas and determining an M-dimensional channel transfer vector for each antenna of the receiver, where M is the number of antennas of a transmitter capable of communicating with the receiver. The set of channel transfer vectors defines a linear vector space. A vector is found in the linear vector space and (M−[N−1]) components of the vector are quantized and provided to the transmitter as feedback. The transmitter may use the feedback components to precode MIMO transmissions in a manner that reduces interference between data transmitted by the transmitter to different antennas of the receiver. In an alternative embodiment, the receiver is simple and/or able to rapidly feedback the components of the selected vectors that measure the channel transmission matrix.

Figure 1:
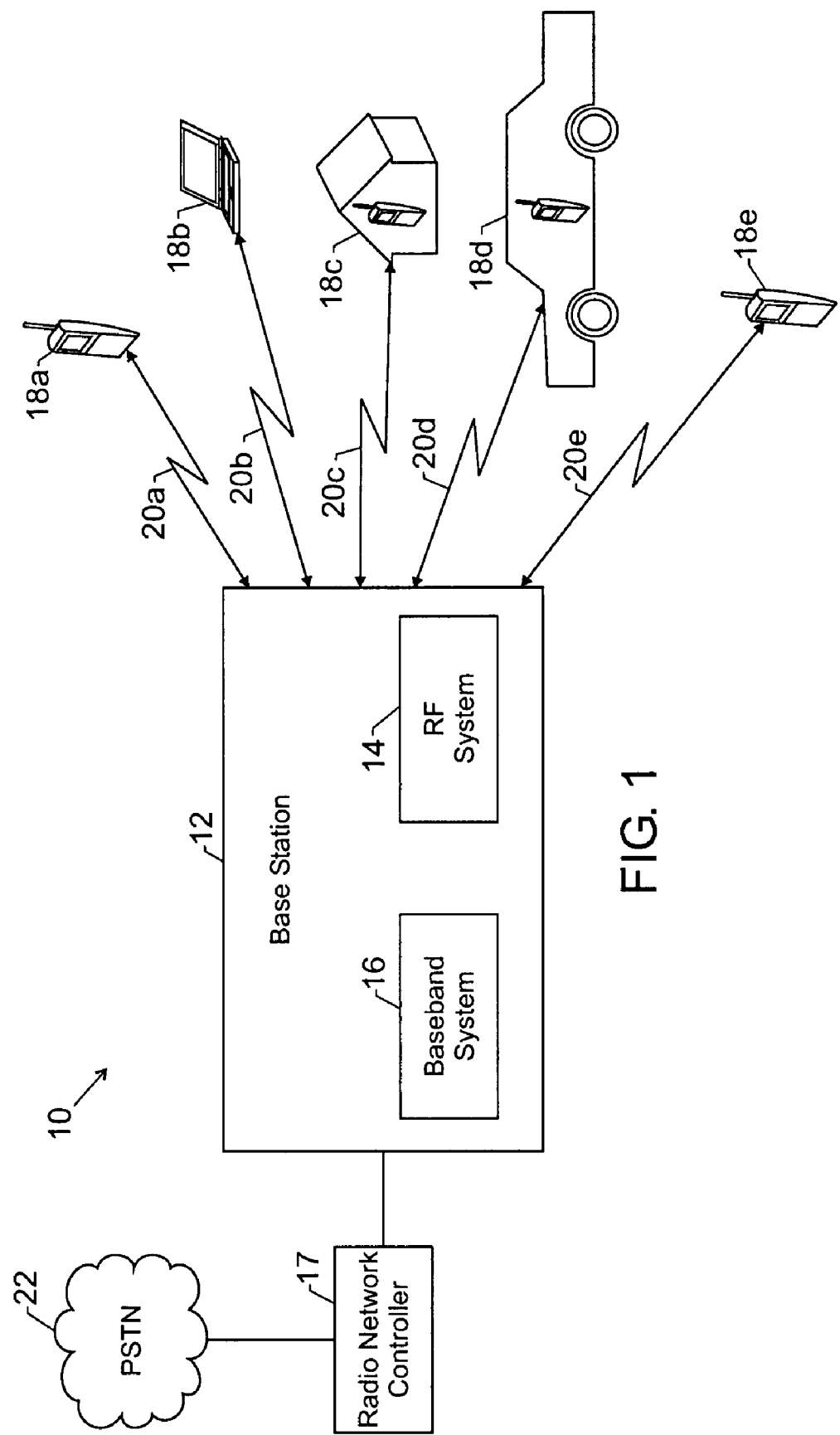
FIG. 1 illustrates an exemplary wireless communication system in accordance with an exemplary embodiment of the present invention.

Turning now to the drawings and referring initially to FIG. 1, an exemplary wireless communications system is illustrated and generally referred to by reference numeral 10. In any given cellular market, such as a typical metropolitan area, a cellular network, such as the wireless communications system 10, may include one or more base stations 12. The base station 12 can communicate with multiple wireless units 18a-18e via wireless communication channels 20a-20e.

The base station 12 may take any suitable form. For example, the base station 12 may include a radio frequency (RF) system 14 and a baseband system 16. The RF system 14 typically includes antennas and transceivers (sometimes called base station radios) that communicate with mobile devices 18a-18e over the wireless communication channels 20a-20e. The mobile devices 18a-18e may be any suitable communications device that may communicate voice, video, and/or data, such as portable cellular telephones 18a and 18e, a computer system having wireless modem 18b, a cellular telephone in a building 18c, and/or a vehicle having mobile cellular telephone and/or navigation system 18d.

The baseband system 16, on the other hand, typically includes a processor that handles communication between the RF system 14 and a radio network controller 17. The base station 12 is typically coupled to a Public Switched Telephone Network (PSTN) 22 through the radio network controller 17. A typical wireless communications system 10 includes a connection to the PSTN 22 because a majority of all wireless telephone calls pass through the PSTN 22. The PSTN 22 may include additional switches and equipment to perform certain functions, such as routing of connections, control switching functions, call processing, data interfacing, tracking, paging, call hand-off, billing, and storing of user data.

The RF system 14 in the base station 12 may either be a distributed or centralized system. Within the RF system 14, each transceiver may be coupled to an antenna to form an RF subsystem (not shown). In a centralized RF system 14, RF subsystems may be located in the same location as the baseband system 16. The RF system 14 and the baseband system 16 may be coupled together via a network (not shown) that may include standard twisted pair, fiber optics, copper, or other suitable means, for example. In a distributed RF system 14, the RF subsystems may be placed in multiple locations separate from the baseband system 16. The baseband system 16 may be connected to the RF subsystems via the network to provide the wireless services, such as CDMA discussed above.

Regardless of whether the RF system 14 is centralized or distributed, the baseband system 16 may manage the power to the wireless communication channels 20a-20e provided by the RF system 14. Because the baseband system 16 manages the call processing for the base station 12, the baseband system 16 may allocate power for the transmissions, and/or manage the power allocated for the transmissions, to maintain control of the limited amount of power provided to the base station 12. The baseband system 16 manages the power provided for transmissions to the wireless units 18a-18e to maintain the level of service for the mobile devices 18a-18e. As such, the baseband system 16 manages the power allocations to maintain the defined levels of service or the addition of additional communication channels 20a-20e to other mobile devices 18a-18e.

The baseband system 16 also manages the communication links for various different technologies, such as TDMA, FDMA, CDMA, and GSM. Specifically, with CDMA, the base station 12 may provide CDMA2000 services, which is a 3 G standard that provides higher capacity within the same amount of frequency spectrum. CDMA2000 includes different phases, which include a first phase of CDMA2000 1x and a second phase of CDMA2000 1x evolution data and voice (1xEVDV) and CDMA2000 1x evolution data only (1xE-VDO). The second phase is backward compatible with the first phase of CDMA2000 1x. As such, different hardware devices and software programs may be utilized in the base station 12 to provide services through CDMA2000 1x, which may include 1x legacy channels, and/or CDMA2000 1xEVDV, which may include EVDV high speed data channels.

The base station 12 or RF system 14 may be assigned a set of communications channels 20a-20e from a portion of the radio frequency spectrum that is assigned to a particular wireless service, such as CDMA2000. The communications channels 20a-20e may include forward channels and reverse channels. The forward channels are signal paths from the base station 12 to the mobile devices 18a-18e. For instance, if the RF subsystem 14 utilizes CDMA2000, the forward channels may include one or more code channels that are transmitted on pilot channels to the mobile devices 18a-18e. The forward channels may be produced by the base station 12 to communicate user and signaling traffic. The reverse channels may be signal paths from the mobile devices 18a-18e to the base station 12. For instance, if the system utilizes CDMA, the reverse channels may also include one or more code channels. The reverse channels may be utilized to communicate data and signaling traffic from the mobile devices 18a-18e to the base station 12. Through the use of these forward channels and reverse channels, the base station 12 and the mobile devices 18a-18e communicate with each other.

Figure 2:
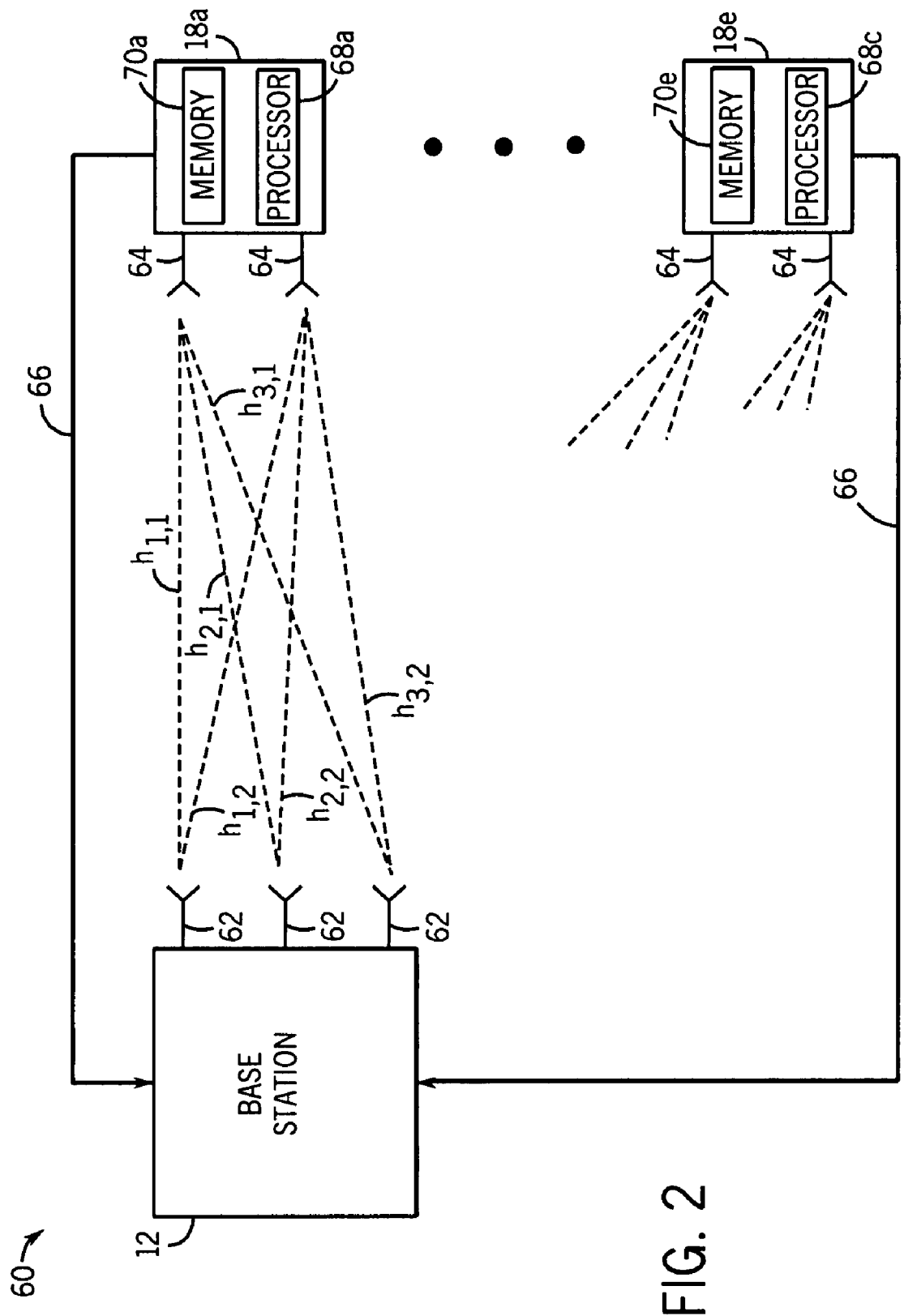
FIG. 2 illustrates a base station with multiple antennas and a plurality of wireless devices with multiple antennas.

As described above, operating a multiple-input multiple-output (MIMO) wireless communication system may increase the capacity of a wireless system by efficiently reducing or eliminating interference between receiver antennas. Turning to FIG. 2, a MIMO system 60 is illustrated wherein the base station 12 and mobile devices 18a-18e of FIG. 1 are illustrated as having multiple antennas. Although FIG. 2 shows three transmitting antennas 62 at the base station 12 and two antennas 64 at each mobile device 18a-18e, there may be any number of antennas and each mobile device 18a-18e is assumed to be equipped with N receiving antennas and the base station 12 is assumed to be equipped with M transmitting antennas. The base station 12 uses the transmitting antennas 62 to transmit information to the mobile devices 18a-18e. Additionally, different mobile devices can have different number of antennas as long as the inequality M>N remains true for the mobile device 18a-18e.

Initially, during communication between the base station 12 and the mobile devices 18a-18e, the base station 12 sends pilot signals to the mobile devices 18a-18e. The pilot signals are signals already known to the mobile devices 18a-18e and allow mobile devices 18a-18e to learn their channel vectors. Specifically, the signal coming from the i-th transmitting antennas 62, where $1 \leq i \leq M$, to the j-th receiving antenna 64, where $1 \leq j \leq N$, of a mobile device is multiplied by the channel coefficient $h_{1,j}$. The channel coefficients $h_{1,j}, \ldots, h_{M,j}$ form the j-th channel vector $h_j$, i.e., $h_j = (h_{1,j}, \ldots, h_{M,j})$. If full or partial information about the channel vectors is known at the base station 12, a dramatic increase of throughput of the entire system 60 may be achieved.

Each mobile device 18a-18e in the MIMO system 60 is provided with a feedback channel 66 to the base station 12. The feedback channel 66 can be used to convey information about its channel vectors to the base station 12. As mentioned above, however, resources, such as time and computing power are limited for providing the feedback.

Figure 3:
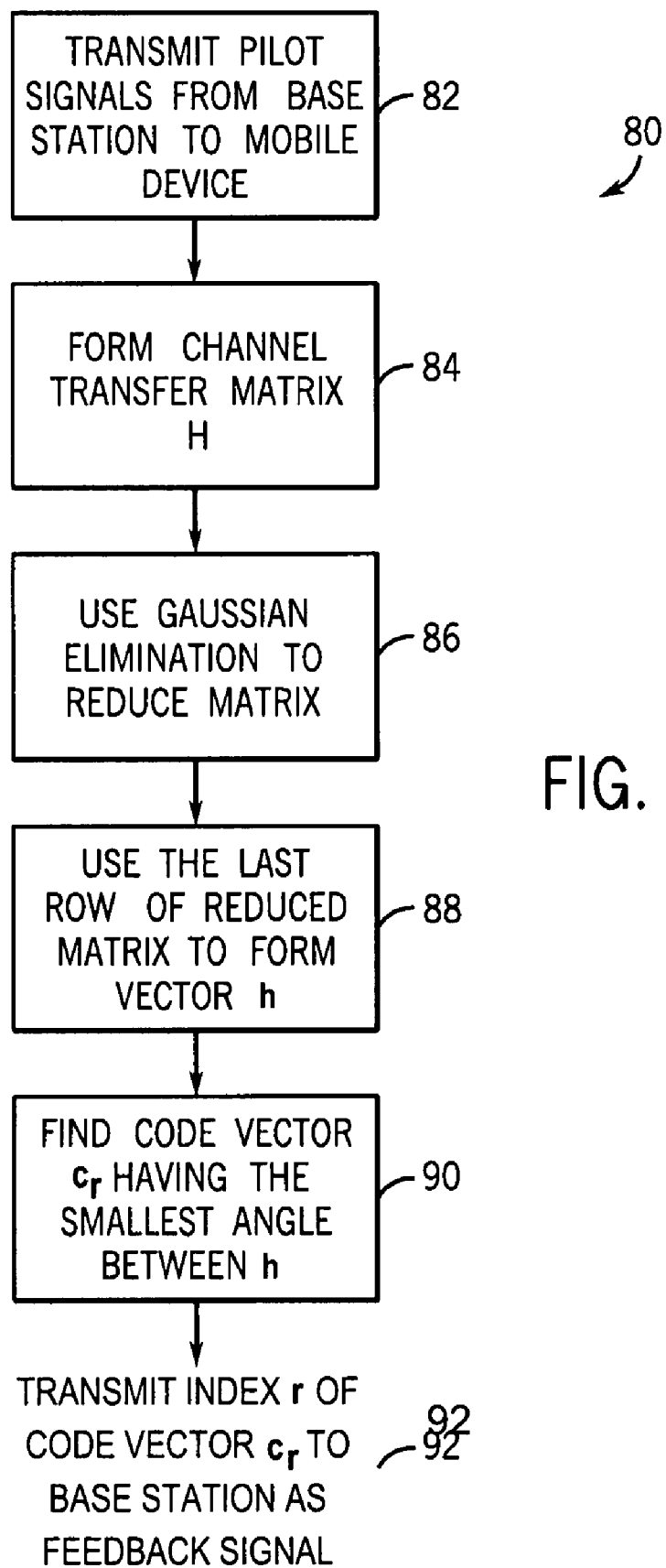
FIG. 3 is a flow chart illustrating a technique for providing feedback in a MIMO system.

To solve this, a vector is found on the linear space defined by the channel transfer vectors and (M−[N−1]) components are quantized and provided as feed back, as shown in the flow chart 80 of FIG. 3. Initially, the base station 12 transmits pilot signals to the mobile devices 18a-18e, as indicated at block 82. Specifically, the pilot signals are transmitted from the plurality of transmitting antennas at the base station 12 to the plurality of receiving antennas at mobile devices 18a-18e. The mobile devices 18a-18e compute channel vectors and form a channel transfer matrix, as indicated at block 84. The channel transfer matrix may be formed as follows:

$$H = \begin{pmatrix} h_{1,1}, h_{2,1}, \ldots, h_{M,1} \\ h_{1,2}, h_{2,2}, \ldots, h_{M,2} \\ \ldots \\ h_{1,N}, h_{2,N}, \ldots, h_{M,N} \end{pmatrix} \quad (4)$$

As indicated at block 86, Gaussian elimination may then be used to reduce the matrix to the form:

$$H' = \begin{pmatrix} h_{1,1}, h_{2,1}, \ldots, h_{M,1} \\ 0, h_{2,2}, \ldots, h_{M,N} \\ \ldots \\ 0, 0, \ldots, 0, h'_{M-N+1,N}, \ldots, h'_{M,N} \end{pmatrix} \quad (5)$$

The last row of the reduced matrix H' may be used to form the vector h as indicated at block 88. This provides a linear combination of the channel vectors that has N−1 null coordinates and belongs to the vector subspace Q. Specifically, the linear combination is represented by the vector $$h = (0, 0, \ldots, 0, h'_{M-N+1,N}, \ldots, h'_{M,N}), \quad (6).$$

Subsequently, an algorithm may be used to find a code vector $c_r$ having the smallest angle relative to the vector h, as indicated at block 90. This is a quantization of the non-zero entries of the vector h. To perform the quantization, the algorithm searches a code book C to find the code vector $c_r$. There are many known fast and simple algorithms for searching among code vectors of a code book C to find the code vector with the smallest distance between the code vector and a given vector h. Since the code vector $c_r$ has a small angle with h, it means that the code vector $c_r$ also has a small angle with the vector subspace Q. Additionally, since the vector h is in vector subspace Q, the vector subspace Q is no longer necessary in the calculation.

Once the code vector $c_r$ is found, its index r may be transmitted to the base station 12 as a feedback signal, as indicated at block 92. The base station 12 may have a copy of the code book C and, thus, is able to use the code vector $c_r$ to determine the channel vector measurement. The base station 12 uses the channel vector measurement to precode transmissions to increase the efficiency of the wireless communication system. Specifically, the base station 12 may precode transmissions in a manner that reduces interference at the receiver.

The above method requires less time and less computing power than alternative methods. This is due in part to the fact that vector subspace Q is not used in the calculation. Additionally, only the non-zero entries in the vector h are used to find the code vector $c_r$. The smaller number of entries the vector h has, the better it may be approximated by code vector $c_r$ from the code book C. For instance, if a vector h is a 1000-tuple, in other words it has 1000 entries, such as, h=($h_1$, $h_2 \ldots, h_{1000}$), it cannot be accurately approximated by any vector of a code book C with $2^{20}$ code vectors. Alternatively, if h is only a 3-tuple, h=($h_1, h_2, h_3$), it can be approximated by a code vector from C with only negligible error. At step 3, the vector h is obtained whose first N−1 entries are zeros, resulting in an (M−[N−1])-tuple. Therefore, this reduction of the number of entries of h allows for the approximation of h with a small quantization error.

Each of the mobile devices 18a-18e includes a processor 68a-e which controls the functioning of the mobile devices 18a-18e, which is generally under the control of software programming. Memory 70a-e is coupled to the processor 68a-e to store and facilitate the execution of software programs. The memory 70a-e may include dynamic random access memory (DRAM), static random access memory (SRAM), reads-only memory (ROM), cd-roms, or other storage devices. As such, the memory 70a-e may be utilized by the processor 68a-e to store data that may relate to the communication channels with the mobile devices and antennas at the base station 12. The data may include signal energy information and antenna information that is related to the communication channels 20a-20e. As such, the techniques described herein may be implemented in software and/or hardware to allow the mobile devices 18a-18e to provide feedback to the base station 12.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

I claim:

1. A method of operating a receiver with N antennas, comprising:
   measuring N vectors, each vector defining channel transfer coefficients between M antennas of a transmitter and a corresponding antenna of the receiver, wherein M and N are greater than or equal to 2;
   selecting a vector in a linear space generated by the N measured vectors, wherein the selected vector has one or more null components along a basis in the linear space; and
   providing quantized values of less than M nonzero components of the selected vector to the transmitter as feedback.

2. The method of claim 1, wherein each component of the measured vectors corresponds to a channel transfer matrix element of a corresponding one of the antennas of the transmitter.

3. The method of claim 2, where in the selected vector has N-1 null components.

4. The method of claim 1 comprising receiving pilot signals from the M antennas of the transmitter and using the pilot signals to measure the N vectors.

5. A communications system, comprising:
   a receiver with N antennas;
   a multiple-input multiple-output (MIMO) transmitter with M antennas, the transmitter being configured to communicate data from its M antennas to the N antennas of the receiver, wherein M and N are greater than or equal to 2; and
   wherein the receiver is configured to measure N vectors in response to the transmitter transmitting pilot signals, each vector defining channel transfer coefficients between the M antennas of the transmitter and a corresponding antenna of the receiver, the receiver being configured to select a vector having one or more null components in a linear space generated by the measured vectors and to feedback quantized values of less than M nonzero components of the selected vector to the transmitter.

6. The system of claim 5, wherein the transmitter is configured to precode data for transmission to the receiver based on the feedback components.

7. A method for providing feedback in a wireless communication system comprising:
   receiving a pilot signal from M transmitters of a base station at N receivers of a mobile device, wherein M and N are greater than or equal to 2;
   computing N channel vectors based on the received pilot signal;
   finding a linear combination of the N channel vectors having N-1 null entries;
   quantizing the non-zero entries of the linear combination; and transmitting the quantized value to the base station.

8. The method of claim 7 wherein quantizing the non-zero entries of the linear combination comprises finding a code vector in a codebook with the smallest angle relative to the linear combination.

9. The method of claim 7 wherein computing N channel vectors based on the received pilot signal comprises computing a channel transfer matrix.

10. The method of claim 9 wherein finding a linear combination of the N channel vectors having N-1 null entries comprises performing a Gaussian elimination on the matrix to reduce the matrix.

* * * * *